June 19, 1956

A. G. GROSS 2,750,833

POLARIZER MEANS FOR ELIMINATING
DOUBLE IMAGES IN GUNSIGHTS

Filed May 17, 1952

INVENTOR.
ARTHUR G. GROSS
BY
J. Edwin Coates
ATTORNEY.

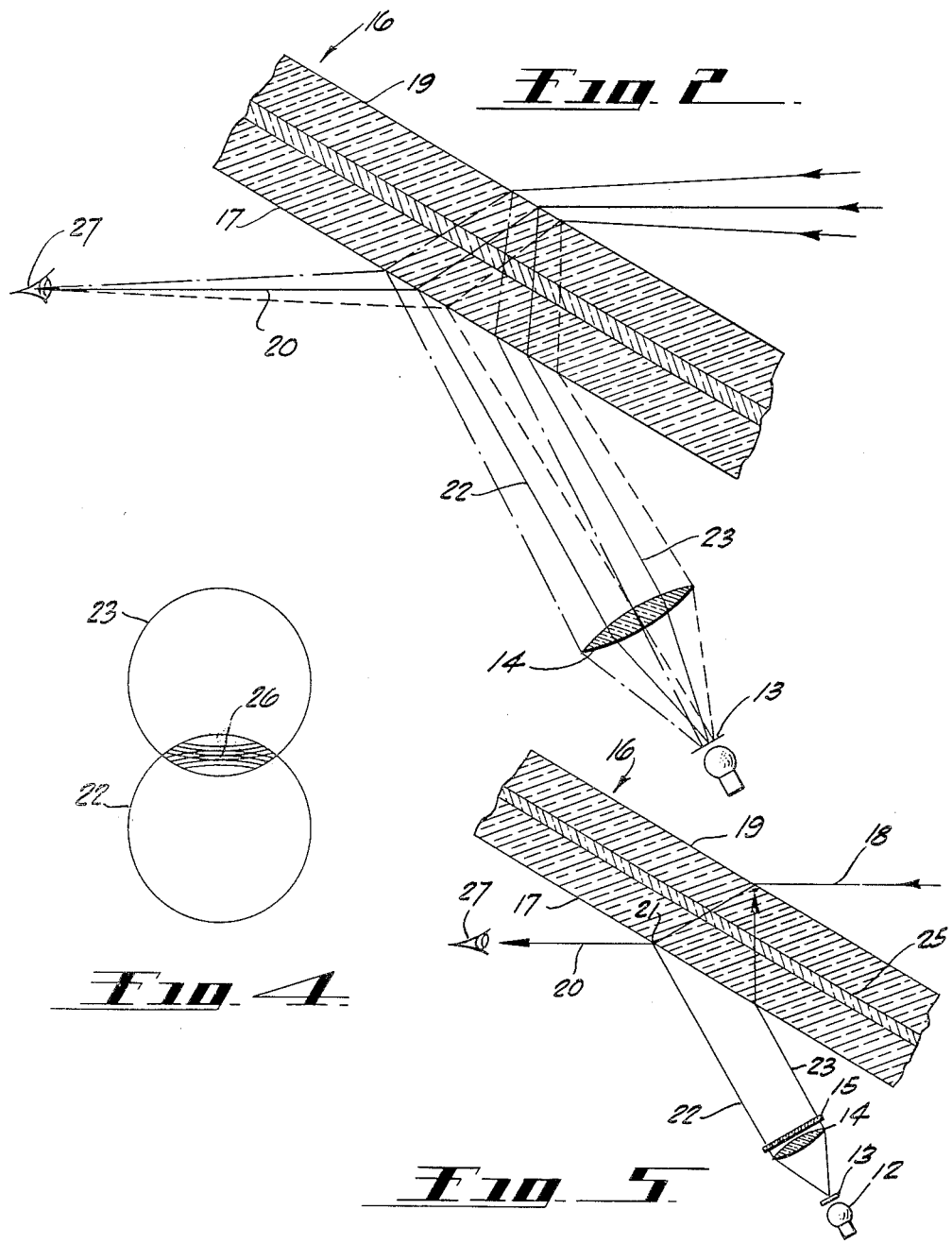

2,750,833

POLARIZER MEANS FOR ELIMINATING DOUBLE IMAGES IN GUNSIGHTS

Arthur G. Gross, Torrance, Calif., assignor to Douglas Aircraft Company, Inc., Santa Monica, Calif.

Application May 17, 1952, Serial No. 288,387

3 Claims. (Cl. 88—2.3)

This invention relates to a method or arrangement in an optical system for eliminating double images which occur in reflector type sights such as are used in gun sighting installations in aircraft wherein a relatively thick windshield is employed as the reflecting element.

Reflector type sights are now generally used in connection with both fixed and flexible guns of military aircraft. In this type of sight, an image of an illuminated reticle is projected by a collimating lens system onto a reflecting surface located in the gunner's line of sight and is reflected by this means along the line of sight to the gunner's eye. Needless to say the reflecting surface must be sufficiently transparent to permit the distant target to be distinctly seen. With a collimating sight the illuminated reticle is imaged at infinity so that the reticle image as seen by the gunner appears to be located at an infinite distance and therefore appears to be superimposed on the target in sharp focus. The outstanding advantage of such a sighting system is that, within the limits of the diameter of the collimating lens, the sighting line direction is independent of the position of the gunner's eye.

In aircraft installations, the line of sight generally traverses a slanting windshield and it has been suggested that the windshield be conveniently used as the transparent reflecting element or surface of the gun sight optical system. However, advantage has also been commonly taken of the windshield to afford the gunner a measure of protection from enemy gunfire. This has been accomplished by increasing the windshield thickness to the point where it serves as armor plate. Such a windshield may have a thickness of three inches from face to face. As long as the windshield thickness remains less than a predetermined relatively small dimension, small compared to the diameter of the collimating lens of the reticle projector, the image reflection by the windshield yields satisfactory results. However, as the thickness of the windshield is increased to gain more and more protection for the gunner, the definition of the reflected image of the illuminated reticle becomes poorer and poorer. Unless the image of the sighting reticle is clear and sharply defined, it is quite difficult to hold the sight on a moving target and thus it is apparent that under these circumstances a choice must be made in the design of the windshield between the relatively great thickness necessary to yield adequate protection against bullet penetration and the relatively small thickness necessary to ensure satisfactory characteristics in the gun sight optical system.

In general, objectionably poor imagery occurs in aircraft applications when the ratio of thickness of the windshield to the diameter of the collimating lens is larger than approximately 1 to 4. This relation is, of course, subject to change by reason of the ratio of lens diameter to focal length. Since space in the cockpit must be conserved a typical collimating lens used in an aircraft has a lens diameter to focal length ratio of about 1 to 2. Thus, for example, if the collimating lens diameter is 4 inches, and the windshield thickness is 3 inches, the lens focal length is 8 inches, then objectionable double images will be formed. Such a windshield under these circumstances would be classed as "relatively thick."

Needless to say the inner and outer surface of the windshield must be parallel to an optical accuracy sufficient to ensure that a ray reflected from the second (outer) surface and twice refracted in its passage through the pane issues parallel to the branch of the same incident ray reflected from the first (inner) surface of the plane within the resolution capacity of the eye. If the windshield pane were not plane and parallel to this degree a double image would be formed at infinite focus of any beam of parallel light precisely collimated from a single point of light. However, even a very well corrected optical system yields perfect collimation of all spectral light only in the paraxial region.

In the usual practical optical systems employed as collimators for a gunsight reticle both spherical and chromatic aberrations are present in the peripheral portions of the optical field. They are appreciable where the angle subtended by the lens is large, a condition aggravated by the crowded space into which a reflector type of gunsight must be accommodated. While not displacing the apparent direction of the center point of the reticle these remnant aberrations cause the outer parts of the reticle lines to appear bent and diffracted into a rainbow shape when they are viewed through a peripheral portion of the optical system. In an installation in which the thickness of the slant pane on which the image is reflected is commensurate with the lens diameter it is inevitable that the two rays which are reflected from the first and second mirror surface into a single ray reaching the eye must have traversed appreciably different parts of the lens and hence brought with them different aberrations from any particular eccentric point of the reticle. The two images will therefore not perfectly merge but merely osculate, and the cross hair or pattern of the reticle will appear blurred and fringed.

In general it is the principal object of this invention to provide a reflector type sight installation in which the optical system is modified so that a clear image of the reticle will be obtained regardless of the thickness of the reflector element.

A specific object is to prevent the formation of multiple images by reflection in an optical system containing a reflector element having more than one effective reflecting surface.

It is a further object to provide in a reflector gun sight system optical means for suppressing either the first reflected or first refracted and second reflected ray portion to prevent the creation of a double image effect.

Other objects of the invention will in part be obvious and will in part appear hereinafter. These objectives are achieved according to this invention by polarization of the collimated light beam and by the separation of the two ray branches by means of rotation of the plane of polarization and extinction of one of the branches.

For a fuller understanding of the nature and objects of the invention, reference should be had to the following detailed description taken in conjunction with the accompanying drawings in which:

Fig. 3 is a side schematic view of one form of the invention;

Fig. 4 is a schematic view of the resultant sighting field developed by the gun sight of Fig. 2 and illustrating the interfering image effect which the present invention is intended to cure, and Fig. 5 is a side schematic view of a modified form of the invention.

Figure 1:
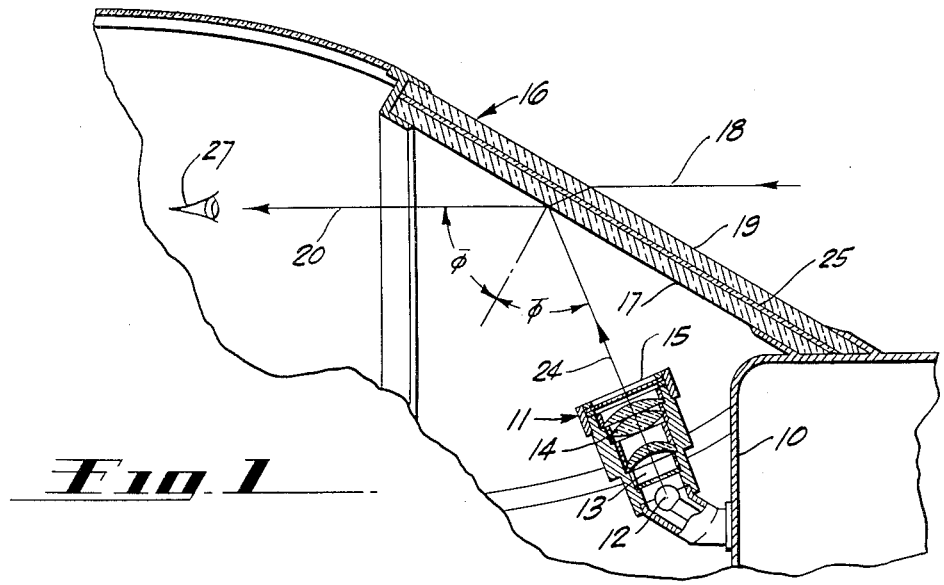
Figure 1 is a section of a fragmentary portion of an airplane showing a reflector type gun sight installation.

Referring to the drawings, and more particularly to Figure 1 thereof, there is shown a fragmentary section of an airplane taken at the pilot cockpit position. Installed on the instrument panel 10 thereof is a reflector sight unit 11 serving as a housing for an electric lamp 12, a reticle 13, of coventional form, and a sheet or screen 15 of polarizing material. In this arrangement the reticle is mounted at the focus of the lens system and is illuminated by the lamp 12. The light rays emerging from the lens system pass through the screen 15 and are plane polarized thereby, the screen being mounted so that it can be rotationally adjusted to permit selection of the plane of polarization. Although any suitable one of the known means may be used which will plane polarize the rays of light emanating from the lens system, it is now preferred to form the screen 15 of the sheet-like polarization material sold under the trademark "Polaroid."

The illustrated gun sight is supposed to be part of that type of an ordnance installation in which the pilot of an aircraft has control of one or more fixed guns which he aims by directionally adjusting the attitude of the aircraft to line it up on the target with appropriate lead if necessary. The principles of the invention apply also to installations in which the gun and sighting installation are directionally adjustable on the aircraft. At any rate the unit 11, as shown for purposes of illustration, is fixedly mounted within the cockpit or gunner's station and below the windshield 16 so that the polarized beam of light rays modified by the form of the reticle is projected upwardly to impinge upon the inner face or first surface 17 of the windshield 16, the latter being mounted at an angle to the line of sight 18 of the pilot-gunner. The windshield is of relatively great thickness and is formed of a plurality of laminations of transparent materials which are preferably cemented together with an adhesive material having an index of refraction substantially the same as the index of refraction of the materials of which the component layers are formed. As will readily be understood, this reduces to a minimum reflections at the interfaces united by the adhesive material.

Figure 2:
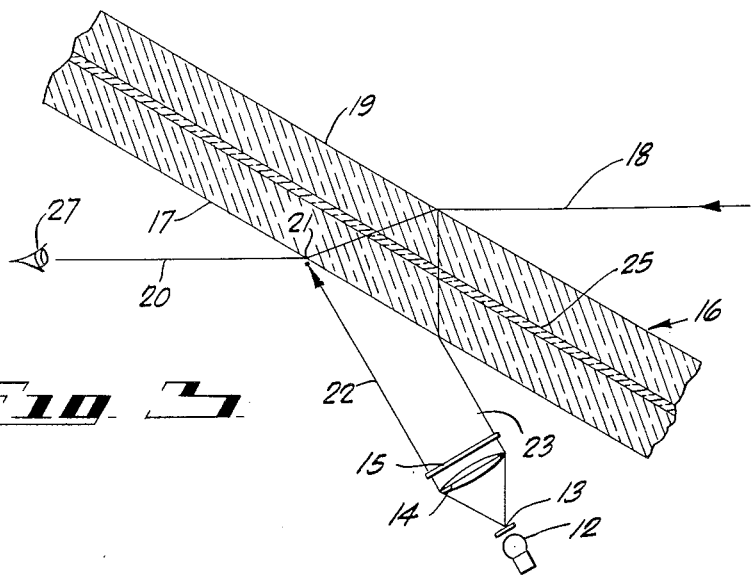
Fig. 2, is a side schematic view of the ray paths in a conventional reflector-type gun sight.

It will be seen in Figure 2, that the inner and outer or first and second surfaces 17 and 19 of the windshield form, with relation to the pilot, front and rear reflecting surfaces, respectively, and that a light ray 20 reaching the eye from a point 21 of the windshield may be composed of an incident part 18 coming from the target, a directly reflected part 22 coming from a reticle point and a secondarily reflected and twice refracted part 23 coming from a reticle point through a different part of the lens 14. These two reticle points are identical only for the center of the reticle fields for which the optical system is properly corrected, but they are slightly different for extra-paraxial points of the reticle field for which the optical system is imperfectly corrected and they are also slightly different for different color light. These differences, while the very crux of the problem solved by this invention, are too small to be shown in this drawing. They are brought out in an enlarged view of what the eye sees, presented in Figure 4.

As previously indicated, it is the purpose of this invention to eliminate one or the other of the bundles of rays 22 or 23. The incorporation of the polarizing screen 15 in the unit 11 is one step in the process. The second step is to mount the windshield at the precise angle at which the incidence of the rays 20 and 24 with respect to the perpendicular to the face of the windshield 16 is the natural polarization angle $\bar{\phi}$ as illustrated in Figure 1. The natural polarization angle may be defined as the angle whose tangent is the ratio of the index of refraction of the second medium to that of the first. Thus this angle is different for various materials and by way of illustration, if the windshield is formed of glass whose index of refraction is 1.523, the polarization angle for an air-to-glass interface is 56° 43' while for the refracted part of the ray at the glass-to-air interface it is its complement, viz: 33° 17'.

With the windshield 16 mounted at the critical angle and bearing in mind that polarized light having its electric field vibrating parallel to the plane of incidence will have zero reflection, it may be seen that if the polarizing screen 15 is properly oriented to transmit only light polarized in the plane as aforesaid, the entirety of the undesired reflections from the windshield surface 17 will be substantially suppressed, although refraction will still occur so that a component of the total light flux will be transmitted into and completely through the windshield body. It is, of course, not desired to eliminate both reflected bundles of rays 22 and 23, but only one or the other of them. The third step in the present invention is the incorporation of means to prevent the elimination of the second one 23, Figure 3 of these two reflected rays, 23 being, as sought reflected from surface 19.

In practicing this third step, advantage is taken of the known property of wave retardation plates by which upon passage therethrough, the plane of vibration of polarized light is rotated through a definite angle. In the present instance it is preferred to use a half-wave plate for this purpose. The action of this plate is merely to cause a change of phase evidenced by rotation of the plane of vibration or of its correlative plane of polarization. Thus the reflection of the refracted ray at the outer surface 19 of the windshield is not suppressed. The ray is reflected and again passes through the windshield and is again rotated 90 degrees by its second passage through the optically active half wave plate and emerges by unimpeded refraction from the inner windshield surface 17 and travels toward the eye as shown in Figure 3. As to the view of the target field, the wave plate being clear and colorless, it will have no resultant effect upon the heterogeneously vibrating light such as is normally transmitted through the windshield and thus it will offer no obstruction to the pilot or gunner's vision. Such rotation causing substances are known as optically active substances. A wave plate of this type may be formed of mica or suitable crystal of just sufficient thickness to produce the desired phase change. But preferably it may consist of commercially available sheet stock of molecularly oriented cellulose acetate or a vinyl compound such as polyvinyl alcohol.

According to the teaching of the present invention, such a wave-plate 25 is incorporated as one of the laminations in the windshield 16. It may be co-extensive with the full area of the windshield or merely may extend over the more limited sighting field. If the wave-plate is of proper thickness so that it rotates the plane of polarization of the light refracted into the windshield by 90° the maximum degree of reflectivity from the glass-air interface of the outer surface 19 of the windshield will be obtained. Thus it is possible to eliminate the reflection from the inner face 17 without reducing the intensity of the image formed by the rays reflected from the outer or rear face. The result is illustrated in Figure 3.

Since only one reticle image is now present, the aberrations existent in the peripheral rays do not appreciably disturb or confuse the gunner. The adverse effect produced when the double image is present is illustrated in Figure 4. The overlapping portion of the two bundles of rays 22 and 23 lies in the center of the field of view. The multiple arcs 26 represent a horizontal line of the reticle as distorted by the aberration of the lens. It should be obvious that such distortion would make it difficult for the gunner to properly sight on a target. With the arrangement according to this invention either the hogging or the sagging part of the image is suppressed or extinguished.

Referring to Figure 5, it is possible to see how, the externally reflected beam 22 can be utilized to convey the reticle image to the gunner's eye while the internally reflected beam 23 is suppressed. In this alternate case the polarizing screen 15 must be so rotationally adjusted that the plane polarized light incident on the inner or front surface 17 of the windshield will be reflected back into the gunner's eye 27. In this case the plane of vibration of the electric field of the light must be perpendicular to the plane of incidence. In this embodiment, the half-wave plate 25 again rotates the plane of polarization of the ray refracted from the reticle projection by 90 degrees, but this now causes reflection to be extinguished upon hitting the glass-air interface 19 at the critical angle. Thus the component that would otherwise be internally reflected is suppressed.

In both forms of the reflecting sight herein described, the means for rotating the plane of vibration has been described as a half-wave plate. To those skilled in the art, it is obvious that the same results may be had by incorporating into the windshield a pair of quarter-wave plates, for the conjoint action of such a pair is substantially the same as the action of a single half-wave plate. If desired, multiples of either type plate can be used if proper care is employed to select the particular number of plates that will give the correct phase rotation of the vibration plane.

It should not be seen that both embodiments of the invention herein shown will provide, regardless of the thickness of the windshield, a sight in which an image of the reticle 13 free of ambiguity is projected into the gunner's eye 27. As the image is free of distortion it is not difficult to hold on the target as are images formed by sights not so corrected. The sight of the present invention is used in the same way as were previously existing sights of the reflector type, and the image seen by the gunner, because of the fact that the rays of light entering his eye are parallel, appears to be located at an infinite distance from his eye and therefore appears to be superimposed on a target located an infinite distance away.

In this specification it has been stated, without furthur qualification, that the windshield or reflecting surface must be set at the polarizing angle. Although this factor is fairly critical and for optimum results this angle should be attained, yet tolerable results may still be obtained by departures from this angular setting through a limited range to either side thereof.

Another obvious factor existing in respect to the present invention is that it is not confined in its application to gun sight installations in airplanes but could be employed in optical systems generally where the unwanted complication of multiple images exists. Actually it has been shown in its application to a gun sight installation merely for purposes of illustration.

Although the now preferred embodiments of the present invention have been shown and described herein, it is to be understood that the same is not limited thereto for it is susceptible to changes in form and detail within the scope of the appended claims.

I claim:

1. In a gun sighting system, a source of light, a transparent protective relatively thick shield having outer and inner surfaces at least partially reflective of light incident thereon and set at an angle to and traversed by the optical axis of the system, means for directing a collimated beam of light modulated with the form of a gun sight reticle from said source to be incident on the adjacent face of said shield at the polarizing angle, means interposed in the path of said beam to cause plane polarization thereof, the said polarizing means being so oriented as to cause the polarization plane of beam to make an angle with its plane of incidence on said outer surface of the shield, the last said angle being any whole number multiple of 90 degrees, and a plate of optically active means laminated within said shield to lie in the path of refracted components of said beam of such thickness as to cause rotation of the plane of polarization of the beam components through an angle which is any odd whole number multiple of 90 degrees before the said beam components become incident upon the inner surface of the remote face of the shield, whereby the light from the reticle is reflected by said inner surface into the optical axis.

2. A gun sight installation having in combination, a sighting station, a transparent protective shield associated with said station, said shield having outer and inner surfaces capable of reflecting a portion of light incident thereon, said shield being disposed at an angle to intercept the line of sight projecting from the sighting station, a source of light, means for directing a collimated beam of light, modulated with the form of a gun sight of the type that includes in optical series from said light source and toward said shield, a gunsight reticle having a gun-sight grid operatively arranged therein, a collimating-lens unit, and a polarizing screen, from said source to be incident on the inner face of the shield at the polarizing angle, means interposed in the path of said beam to cause polarization thereof, the said polarizing means being so oriented as to cause the polarization plane of the polarized beam to make an angle with the plane of incidence of the light on said outer surface of said shield and a plate of optically active means incorporated in said shield to lie in the path of refracted components of said beam, of such thickness as to cause rotation of the plane of polarization of the beam components to that angle which will cause maximum or minimum reflectance from the inner surface of the outer face of the shield, whereby the light from the light source is reflected by said inner surface into said optical axis.

3. In an aircraft: a gunsight system corrected for double-imagery and comprising a light source; a gunsighting station; a relatively thick, transparent protective shield having mutually parallel, inner and outer surfaces at least partially reflective of light incident thereon, said member being set at an angle to, and traversed by, the optical axis of the system; means including a gunsight reticle having a collimating lens unit of a predetermined diameter for directing a collimated beam of light modulated with the grid of a gunsight from said source to be incident on the adjacent, inner face of said shield at the polarizing angle of said beam; the ratio of the diameter of said lens to the thickness of said shield being of the order of 4 to 3 respectively, the ratio of the focal length of the lens to the lens diameter being of the order of 2 to 1; means interposed in the path of said beam to cause plane polarization thereof, the polarizing means being so oriented as to cause the beam's polarization plane to make a predetermined effective angle with its plane of incidence on said outer surface of the shield; and a plate of optically active means laminated within said shield to lie in the path of the reflected components of said beam, said plate being adapted to effect such rotation of the beam's polarization plane as is adequate to effect reflection of the light from the reticle by said inner surface into the aforesaid optical axis and along same into said gunsighting station.

References Cited in the file of this patent

UNITED STATES PATENTS

| | | |
|---|---|---|
| 1,834,017 | Carbonara | Dec. 1, 1931 |
| 2,018,963 | Land | Oct. 29, 1935 |
| 2,102,632 | Land | Dec. 21, 1937 |
| 2,119,577 | Gray | June 7, 1938 |
| 2,155,436 | McNally | Apr. 25, 1939 |
| 2,214,802 | Tillyer | Sept. 17, 1940 |
| 2,237,565 | Land | Apr. 8, 1941 |
| 2,264,044 | Lee | Nov. 25, 1941 |
| 2,323,059 | Land | June 29, 1943 |
| 2,394,521 | Lynn | Feb. 5, 1946 |
| 2,396,902 | Tuttle | Mar. 19, 1946 |